United States Patent
Suzuki

(10) Patent No.: US 12,060,106 B2
(45) Date of Patent: Aug. 13, 2024

(54) STRUCTURAL MEMBER FOR AUTOMOBILE BODY

(71) Applicant: NIPPON STEEL CORPORATION, Tokyo (JP)

(72) Inventor: Toshiya Suzuki, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 18/016,260

(22) PCT Filed: Jul. 28, 2021

(86) PCT No.: PCT/JP2021/027843
§ 371 (c)(1),
(2) Date: Jan. 13, 2023

(87) PCT Pub. No.: WO2022/025098
PCT Pub. Date: Feb. 3, 2022

(65) Prior Publication Data
US 2023/0271649 A1    Aug. 31, 2023

(30) Foreign Application Priority Data
Jul. 31, 2020 (JP) .................... 2020-130553

(51) Int. Cl.
*B62D 21/15* (2006.01)
(52) U.S. Cl.
CPC .................. *B62D 21/15* (2013.01)

(58) Field of Classification Search
CPC ...... B62D 21/15; B62D 25/025; B62D 25/04; B60R 2019/1806; B60R 2019/1826; B60R 19/18
See application file for complete search history.

(56) References Cited

U.S. PATENT DOCUMENTS

| | | | |
|---|---|---|---|
| 2008/0054655 | A1 | 3/2008 | Kizaki et al. |
| 2010/0066106 | A1* | 3/2010 | Nojima .................. B60R 19/18 |
| | | | 293/120 |
| 2012/0228889 | A1 | 9/2012 | Haneda et al. |
| 2019/0076963 | A1* | 3/2019 | Hara .................. B23K 26/0869 |
| 2021/0061080 | A1* | 3/2021 | Otoguro .................. B62D 21/15 |
| 2021/0245812 | A1* | 8/2021 | Sonobe .................. B60R 19/18 |

(Continued)

FOREIGN PATENT DOCUMENTS

| | | |
|---|---|---|
| JP | 54-34914 U | 3/1979 |
| JP | 2009-166557 A | 7/2009 |

(Continued)

*Primary Examiner* — Amy R Weisberg
*Assistant Examiner* — Shams Dhanani
(74) *Attorney, Agent, or Firm* — Birch, Stewart, Kolasch & Birch, LLP

(57) ABSTRACT

Disclosed is a structural member for an automobile body includes: a hat channel member that has a top sheet portion, a pair of side wall portions extending via first corner portions, and a pair of flange portions extending via second corner portions; and a joining member that has a pair of joining portions and a top sheet facing portion, wherein a first bead extending in the longitudinal direction is formed on the top sheet portion, and wherein two or more second beads extending in a direction intersecting the longitudinal direction are formed on the pair of side wall portions.

20 Claims, 13 Drawing Sheets

(56) References Cited

U.S. PATENT DOCUMENTS

| | | | | |
|---|---|---|---|---|
| 2022/0081033 A1* | 3/2022 | Higai | .................... | B62D 21/15 |
| 2022/0089223 A1* | 3/2022 | Higai | .................... | B62D 21/15 |
| 2022/0135134 A1* | 5/2022 | Hamada | ................ | B62D 27/02 |
| | | | | 296/203.01 |
| 2022/0219631 A1* | 7/2022 | Higai | ...................... | B32B 7/05 |
| 2022/0258804 A1* | 8/2022 | Higai | ................... | B62D 29/007 |
| 2022/0281528 A1* | 9/2022 | Ihara | ........................ | F16B 5/08 |
| 2022/0297759 A1* | 9/2022 | Nagahama | ........... | B62D 27/023 |
| 2022/0388574 A1* | 12/2022 | Galceran Oms | ..... | B21D 22/022 |
| 2023/0062947 A1* | 3/2023 | Matecki | .................. | B60R 19/03 |
| 2023/0070480 A1* | 3/2023 | Song | .................. | B62D 25/025 |
| 2023/0087083 A1* | 3/2023 | Ono | ....................... | B60R 19/18 |
| | | | | 293/102 |
| 2023/0219623 A1* | 7/2023 | Higai | ..................... | B62D 21/15 |
| | | | | 296/187.03 |
| 2023/0257899 A1* | 8/2023 | Higai | ................... | B62D 21/15 |
| | | | | 428/34.1 |

FOREIGN PATENT DOCUMENTS

| | | |
|---|---|---|
| JP | 4330652 B2 | 9/2009 |
| JP | 5119477 B2 | 1/2013 |
| JP | 2013-220807 A | 10/2013 |
| JP | 2020-26151 A | 2/2020 |
| WO | WO 01/44017 A1 | 6/2001 |
| WO | WO 2017/159425 A1 | 9/2017 |

* cited by examiner (a)

THREE-POINT BENDING (LOCAL BUCKLING MODE)

(b)

THREE-POINT BENDING (WALL SURFACE BUCKLING MODE)

(c)

MOMENT BENDING

STRUCTURAL MEMBER FOR AUTOMOBILE BODY

TECHNICAL FIELD

The present invention relates to a structural member for an automobile body. Priority is claimed on Japanese Patent Application No. 2020-130553, filed Jul. 31, 2020, the content of which is incorporated herein by reference.

BACKGROUND ART

In recent years, application of high-tensile steel sheets to automobile components has been expanding for the purposes of improving collision safety performance of automobiles and reducing the weight for an automobile body. By applying a high-tensile steel sheet, it is possible to obtain components having more excellent collision safety performance, or to achieve both collision safety performance and weight reduction by thinning.

However, when a sheet thickness of a material becomes thin, not only does stiffness of the steel sheet before processing decrease, but stiffness of the components after processing also decreases. Therefore, if a steel sheet having high strength and a thin sheet thickness is simply used, a sufficient effect of increasing the strength of collision safety performance may not be obtained.

Collision safety performance of automobile body components includes bending-crushing characteristics of a side sill or a B pillar in a side collision, a bumper in a front collision, or the like. It is desired to increase three-point bending characteristics in a local buckling mode as the bending-crushing characteristics of these components and to exhibit higher collision safety performance even when a material having a thin sheet thickness is used.

A collision-resistant reinforcing material for vehicles which has excellent buckling resistance and is designed to provide a concave bead extending in a longitudinal direction of a main body portion at a center of the main body portion in a width direction is disclosed in Patent Document 1.

A metal absorber for vehicles which has concave or convex beads substantially parallel to a front-rear direction of a vehicle on one or both of an upper web and a lower web is disclosed in Patent Document 2.

CITATION LIST

Patent Document

[Patent Document 1]
Japanese Patent No. 5119477
[Patent Document 2]
Japanese Patent No. 4330652

SUMMARY OF THE INVENTION

Problems to be Solved by the Invention

However, in the techniques of Patent Documents 1 and 2, higher three-point bending characteristics in the local buckling mode of bending-crushing components which is required could not be sufficiently exhibited.

The present invention has been made in view of the above problems, and an object of the present invention is to provide a structural member capable of exhibiting excellent collision safety performance by improving a load capacity at an initial stage of a stroke of a deformation in a local buckling mode.

Means for Solving the Problem

Specific aspects of the present invention are as follows.
(1) According to a first aspect of the present invention, there is provided a structural member for an automobile body, including: a hat channel member that has a top sheet portion extending in a longitudinal direction, a pair of side wall portions extending via first corner portions formed at both end portions of the top sheet portion in a width direction, and a pair of flange portions extending via second corner portions formed at end portions of the pair of side wall portions on sides opposite to the first corner portions; and a joining member that has a pair of joining portions joined to the pair of flange portions of the hat channel member, and a top sheet facing portion facing the top sheet portion of the hat channel member, wherein a first bead extending in the longitudinal direction is formed on the top sheet portion, and wherein two or more second beads extending in a direction intersecting the longitudinal direction are formed on the pair of side wall portions.
(2) In the structural member for an automobile body according to (1), two or more of the first beads may be formed in parallel in the width direction.
(3) In the structural member for an automobile body according to (2), the first bead may be formed such that a center of the first bead in the width direction is positioned in a region from a boundary point between the top sheet portion and the first corner portion to a point having a separation distance of ¼ of a width of the top sheet portion in the width direction in a cross section perpendicular to the longitudinal direction.
(4) In the structural member for an automobile body according to (2), the first bead may be formed such that a boundary point between the first bead and the top sheet portion is positioned in a region from a boundary point between the top sheet portion and the first corner portion to a point having a separation distance of 20 mm in a cross section perpendicular to the longitudinal direction.
(5) In the structural member for an automobile body according to any one of (1) to (4), the second bead may extend from the first corner portion.
(6) In the structural member for an automobile body according to (5), the second bead may extend to the second corner portion.
(7) In the structural member for an automobile body according to any one of (1) to (6), a width of the first bead may be 5 mm to 20 mm, and a depth of the first bead may be 5 mm to 20 mm.
(8) In the structural member for an automobile body according to any one of (1) to (7), an aspect ratio calculated as a depth/a width of the first bead may be 0.25 to 4.0.
(9) In the structural member for an automobile body according to any one of (1) to (8), a width of the second bead may be 10 mm to 60 mm, and a depth of the second bead may be 2 mm to 10 mm.
(10) In the structural member for an automobile body according to any one of (1) to (9), an aspect ratio calculated as a depth/a width of the second bead may be 0.05 to 1.0.

(11) In the structural member for an automobile body according to any one of (1) to (10), the top sheet portion of the hat channel member may be formed of a steel sheet having a sheet thickness of 1.2 mm or less.

(12) In the structural member for an automobile body according to any one of (1) to (11), the top sheet portion of the hat channel member may be formed of a steel sheet having a tensile strength of 980 MPa or more.

(13) In the structural member for an automobile body according to any one of (1) to (12), the hat channel member may be a quenched member.

Effects of the Invention

According to the present invention, it is possible to increase deformation resistance against each of a stress in a longitudinal direction and a stress in a height direction generated in components with respect to three-point bending characteristics in a local buckling mode of bending-crushing components and to obtain high collision safety performance even when a material having a thin sheet thickness is used.

EMBODIMENT(S) FOR IMPLEMENTING THE INVENTION

Bending-crushing characteristics of an automobile component are roughly divided into three-point bending characteristics in a case where impact of a collision is directly applied to a crushing portion of the component to deform the crushing portion and moment bending characteristics in a case where impact of a collision is indirectly applied to a crushing portion of the component to deform the crushing portion.

Of these, the three-point bending characteristics are classified into three-point bending characteristics in a local buckling mode and three-point bending characteristics in a wall buckling mode.

The three-point bending characteristics in a local buckling mode and the three-point bending characteristics in a wall buckling mode are often evaluated on the basis of three-point bending characteristics obtained by performing a three-point bending test in which an impactor directly collides with the component as shown in FIGS. 1(a) and 1(b).

In the three-point bending characteristics in a local buckling mode, bending deformation at a load-applying position of the impactor under a condition that a distance between fulcrums supporting a load is long in the three-point bending test is a main constituent.

In the three-point bending characteristics in a wall buckling mode, deformation in which a side wall is crushed in a height direction of the component with a load-applying position of the impactor as a center under a condition that a distance between fulcrums supporting a load is short in the three-point bending test is a main constituent.

Further, as shown in FIG. 1(c), the moment bending characteristics are often evaluated on the basis of moment bending characteristics obtained by performing a moment bending test in which the impactor or the like does not come into contact with the crushing portion of the component.

Figure 1:
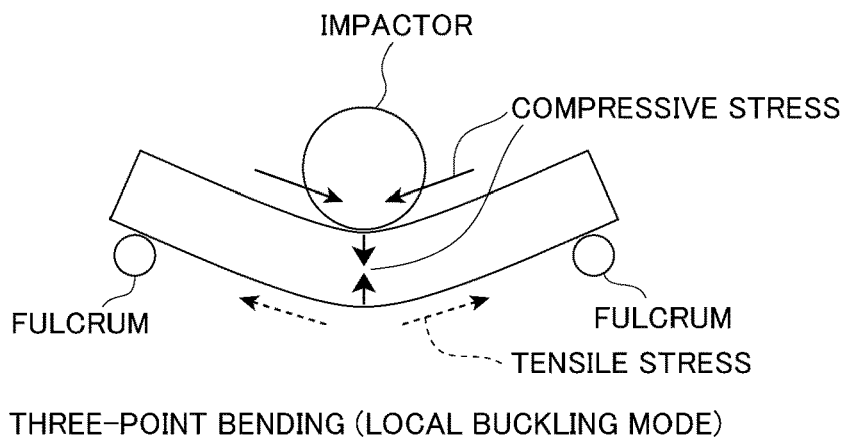
FIG. 1(a) is a schematic view for explaining three-point bending characteristics in a local buckling mode.
FIG. 1(b) is a schematic view for explaining three-point bending characteristics in a wall buckling mode.
FIG. 1(c) is a schematic view for explaining moment bending characteristics.
Figure 1:
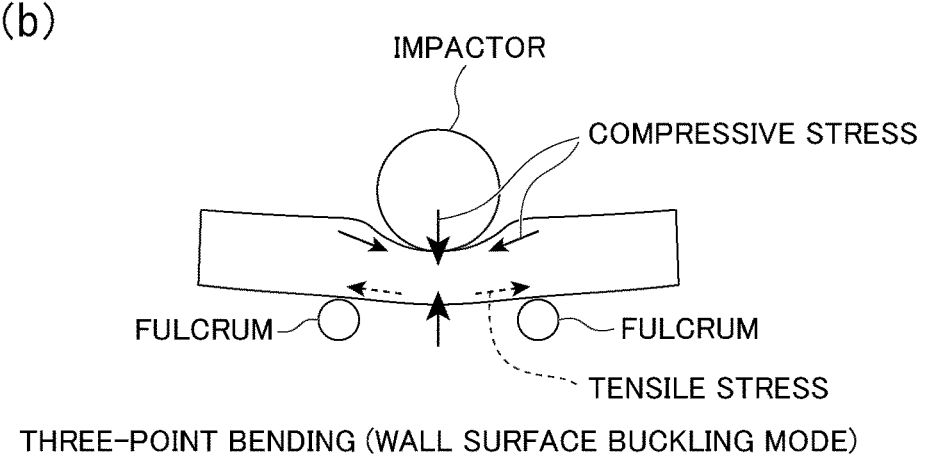
Figure 1:
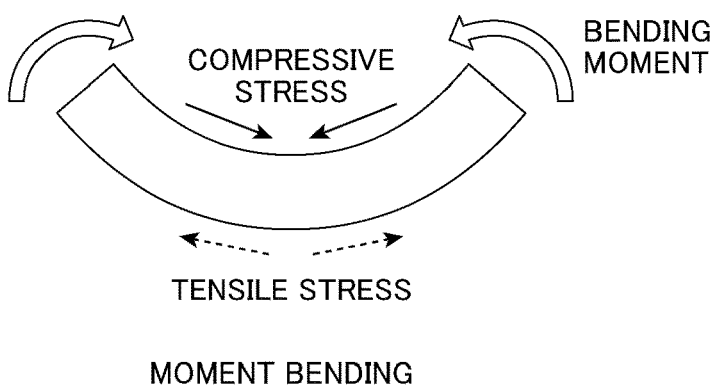

The present inventor examined a shape of the component for enhancing collision safety performance with respect to the deformation in the local buckling mode as shown in FIG. 1 (a) and obtained the following findings.

(A) In three-point bending where the crushing portion comes into contact with the impactor, a compressive stress is generated in the height direction of the component in addition to a compressive stress of the bending on an inner side and a tensile stress of the bending on an outer side in a longitudinal direction of the component.

(B) Since the compressive stress in the height direction of the component is generated on the side wall of the component, especially in a case where a sheet thickness of a material is thin, the side wall may be easily buckled and deformed by the compressive stress in the height direction, and even a component which is assumed to be in the local buckling mode may be in a deformation state close to the wall buckling mode at an initial stage of the deformation.

(C) In a case where the component is in the deformation state close to the wall buckling mode, if the buckling deformation of the side wall easily occurs, not only can excellent three-point bending characteristics in the wall buckling mode not be obtained, but because a component height of the crushing portion is reduced due to the side wall being crushed and bending rigidity in the height direction of a cross section intersecting the longitudinal direction is reduced, it may also be impossible to obtain excellent three-point bending characteristics in the local buckling mode even if a deformation state of the local buckling mode occurs in the subsequent deformation.

(D) Therefore, by making the shape of the component into a shape that allows deformation resistance against the compressive stress of the bending on the inner side, deformation resistance against the tensile stress of the bending on the outer side, and deformation resistance against the compressive stress in the height direction to simultaneously increase, it is possible to improve a load capacity in the deformation in the local buckling mode at an initial stage of a stroke particularly, and it is possible to exhibit more excellent collision safety performance than in the related art.

Hereinafter, the present invention completed on the basis of the above findings will be described in detail on the basis of embodiments. In the present specification and the drawings, elements having substantially the same functional configuration are designated by the same reference symbols, and duplicate descriptions thereof will be omitted.

In the following description, an axial direction of a structural member, that is, a direction in which an axis extends, is referred to as a longitudinal direction Z.

Further, a direction parallel to a top sheet portion on a plane perpendicular to the longitudinal direction Z is referred to as a width direction X, and a direction perpendicular to the longitudinal direction Z and the width direction X is referred to as a height direction Y.

A direction away from the axis of the structural member is referred to as an outward direction, and a direction opposite to the outward direction is referred to as an inward direction.

First Embodiment

Hereinafter, a structural member 100 of an automobile body according to a first embodiment of the present invention (hereinafter referred to as a structural member 100) will be described.

First, a schematic configuration of the structural member 100 will be described with reference to FIG. 2.

Figure 2:
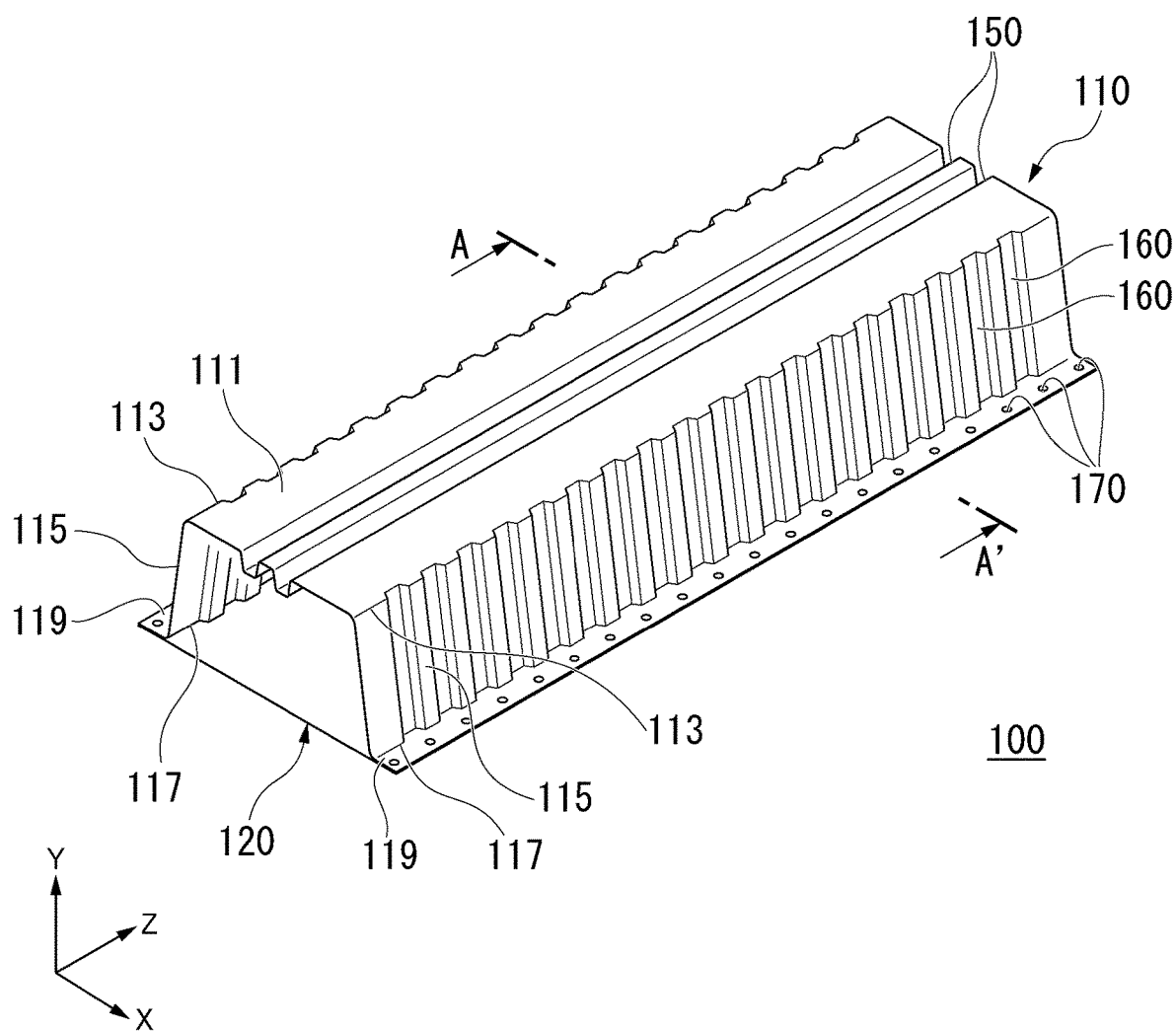
FIG. 2 is a perspective view showing a structural member 100 according to a first embodiment.

As shown in FIG. 2, the structural member 100 is a member having a closed cross-section structure constituted by a hat channel member 110 and a joining member 120. Application examples of the structural member 100 include a B pillar, a side sill, a bumper reinforcement, and the like.

The structural member 100 according to the present embodiment is a component which is assumed to be installed in an automobile in a posture in which the hat channel member 110 faces the outside of the automobile and the joining member 120 faces the inside of the automobile.

(Hat Channel Member)

Figure 3:
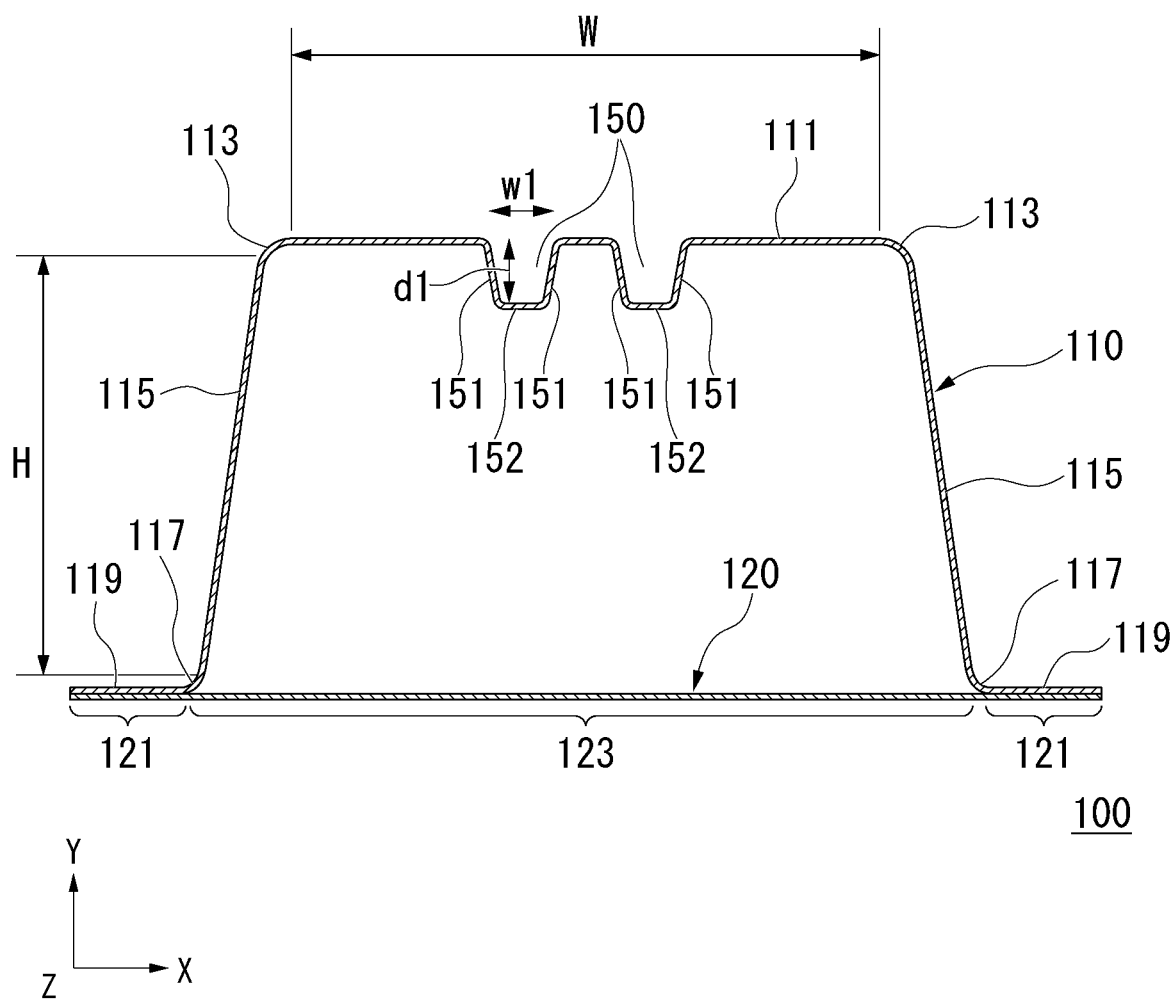
FIG. 3 is a cross-sectional view along line A-A' of FIG. 2.

FIG. 3 is a cross-sectional view along line A-A' of FIG. 2. As shown in FIG. 3, the hat channel member 110 has a top sheet portion 111 extending in the longitudinal direction Z, a pair of side wall portions 115 and 115 extending via first corner portions 113 and 113 formed at both ends of the top sheet portion 111 in the width direction X, and a pair of flange portions 119 and 119 extending via second corner portions 117 and 117 formed at end portions of the pair of side wall portions 115 and 115 on sides opposite to the first corner portions 113 and 113.

The hat channel member 110 may be a member made of a resin sheet, a carbon fiber reinforced plastic (CFRP) sheet, or a metal sheet (an aluminum sheet, an aluminum alloy sheet, a stainless sheet, a titanium sheet, a steel sheet, or the like).

The hat channel member 110 can be easily formed by, for example, cold press-forming or warm press-forming of a sheet material.

Further, the hat channel member 110 may be formed by hot stamping in which a steel sheet is heated to a high temperature in an austenite region and then is press-formed by a die, and at the same time, quenching treatment is performed in the die. Therefore, the hat channel member 110 may be a quenched member.

(Top Sheet Portion)

The top sheet portion 111 corresponds to a portion in direct contact with the impactor in the three-point bending test in the local buckling mode shown in FIG. 1.

The structural member 100 according to the present embodiment is installed in an automobile in a posture in which the hat channel member 110 faces the outside of the automobile. Therefore, when an impact load from the outside of the automobile is input to the top sheet portion 111 and bending deformation occurs in the structural member 100, a compressive stress is generated in the top sheet portion 111 in the longitudinal direction Z.

From the viewpoint of weight reduction, the top sheet portion 111 is preferably formed of a steel sheet having a sheet thickness of 1.2 mm or less and is more preferably formed of a steel sheet having a sheet thickness of 1.0 mm or less. A lower limit of the sheet thickness of the top sheet portion 111 is not particularly limited and may be 0.3 mm or more.

Further, from the viewpoint of the collision safety performance, the top sheet portion 111 is preferably formed of a steel sheet having a tensile strength of 980 MPa or more and is more preferably formed of a steel sheet having a tensile strength of 1470 MPa or more.

A width W of the top sheet portion 111 may be 40 mm or more and 200 mm or less. As shown in FIG. 3, the width W of the top sheet portion 111 is a separation distance in the width direction X between boundary points of the top sheet portion 111 and the first corner portions 113 and 113 at both ends of the top sheet portion 111 in the cross section perpendicular to the longitudinal direction Z of the structural member 100.

The first bead 150 formed on the top sheet portion 111 will be described later.

(Side Wall Portion)

A pair of side wall portions 115 and 115 extend via the first corner portions 113 and 113 formed at both end portions of the top sheet portion 111 in the width direction X. The first corner portions 113 and 113 have an R portion having a radius of curvature of 1 mm to 10 mm, for example.

Since the structural member 100 according to the present embodiment is installed in the automobile in a posture in which the hat channel member 110 faces the outside of the automobile, when an impact load from the outside of the automobile is input to the top sheet portion 111 and bending deformation occurs in the structural member 100, a compressive stress in a direction intersecting the longitudinal direction Z, that is, a compressive stress along the side wall portion 115 in a cross section perpendicular to the longitudinal direction Z of the structural member 100, is generated in the pair of side wall portions 115 and 115.

A second bead 160 formed on the side wall portion 115 will be described later.

A sheet thickness and a tensile strength of the side wall portion 115 may be the same as the sheet thickness and the tensile strength of the top sheet portion 111.

A height H of the side wall portion 115 may be 20 mm or more and 150 mm or less. As shown in FIG. 3, the height H of the side wall portion 115 is a separation distance in the height direction Y between a boundary point of the side wall portion 115 and the first corner portion 113 and a boundary point of the side wall portion 115 and the second corner portion 117 in the cross section perpendicular to the longitudinal direction Z of the structural member 100. The second corner portions 117 and 117 have an R portion having a radius of curvature of 1 mm to 10 mm, for example.

(Flange Portion)

As shown in FIGS. 2 to 5, the second corner portions 117 and 117 are formed at the end portions of the pair of side wall portions 115 and 115 opposite to the first corner portions 113 and 113. The pair of flange portions 119 and 119 are formed to extend outward from the second corner portions 117 and 117.

Spot welded portions 170 for joining the flange portion 119 to the joining member 120 are formed on the flange portion 119 at a predetermined pitch in the longitudinal direction Z. Spot welding is an example of means for joining, and laser welding or brazing is also possible.

(Joining Member)

Hereinafter, the joining member 120 will be described.

The joining member 120 is a member that is joined to the hat channel member 110. Since the structural member 100 according to the present embodiment is installed in the automobile in a posture in which the joining member 120 faces the inside of the automobile, when an impact load from the outside of the automobile is input to the top sheet portion 111 and bending deformation occurs in the structural member 100, a tensile stress in the longitudinal direction Z is generated in the joining member 120.

Therefore, since the joining member 120 is joined to the hat channel member 110 to be capable of increasing the deformation resistance against the tensile stress in the longitudinal direction Z, it is possible to exhibit high collision safety performance.

Further, by joining the joining member 120 to the hat channel member 110, it is possible to prevent the side wall portion 115 from opening in the width direction X when the bending deformation occurs in the structural member 100. Therefore, it is possible to prevent a decrease in the three-point bending characteristics and to exhibit high collision safety performance.

As shown in FIGS. 2 and 3, in the structural member 100 according to the present embodiment, one flat sheet material is used as the joining member 120.

The joining member 120 may be a member made of a resin sheet, a carbon fiber reinforced plastic (CFRP) sheet, or a metal sheet (an aluminum sheet, an aluminum alloy sheet, a stainless sheet, a titanium sheet, a steel sheet, or the like).

The tensile strength and the sheet thickness of the joining member 120 are not particularly limited. As described above, when an impact load from the outside of the automobile is input to the top sheet portion 111 and bending deformation occurs in the structural member 100, a tensile stress in the longitudinal direction Z is generated in the joining member 120. If a compressive stress is generated, the sheet thickness and the strength of the member greatly influence the buckling deformation due to the compressive stress, but in the case of the tensile stress, a material having a thin sheet thickness and a low strength may be used as long as the member does not fracture due to the tensile deformation. Therefore, for example, the tensile strength and the sheet thickness of the joining member 120 may be lower and thinner than the tensile strength and the sheet thickness of the top sheet portion 111 of the hat channel member 110. Here, the joining member 120 may be a quenched member.

As shown in FIG. 3, the joining member 120 has a pair of joining portions 121 and 121 provided at both ends in the width direction X and a top sheet facing portion 123 provided at a center in the width direction X.

The pair of joining portions 121 and 121 are portions with which the pair of flange portions 119 and 119 of the hat channel member 110 to be joined by spot welding or the like come into surface contact.

The top sheet facing portion 123 is a portion of the joining member 120 excluding the joining portion 121 and is a portion facing the top sheet portion 111 of the hat channel member 110. The top sheet facing portion 123 does not have a structure that supports the top sheet portion 111 from the inside. That is, the top sheet facing portion 123 is not in contact with an inner surface of the top sheet portion 111. Since the length of the perimeter of a cross section surrounded by a closed cross section of the structural member 100 relative to area can be reduced, the three-point bending characteristics obtained relative to the weight of the member (for example, the maximum load) can be efficiently increased. That is, weight reduction can be realized.

In the structural member 100 according to the present embodiment, since the joining member 120 is constituted by a single flat sheet-shaped steel sheet, the joining portion 121 and the top sheet facing portion 123 are flush with each other and adjacent to each other.

A width of the top sheet facing portion 123 may be 40 mm or more and 200 mm or less. The width of the top sheet facing portion 123 is preferably larger than the width W of the top sheet portion 111. In this case, the pair of side wall portions 115 and 115 are inclined to expand outward from the first corner portions 113 and 113 to the second corner portions 117 and 117. In a case where an impact load from the outside of the automobile is input to the top sheet portion 111, under a condition that the second bead 160 is disposed on the side wall portion 115, the pair of side wall portions 115 and 115 are likely to collapse in a direction in which the pair of side wall portions 115 and 115 on sides of the first corner portions 113 and 113 approach each other, but the top sheet portion 111 can support the pair of side wall portions 115 and 115 via the first corner portions 113 and 113. Therefore, an effect that the cross section perpendicular to the longitudinal direction Z of the hat channel member 110 is less likely to be crushed can be obtained. Further, in a case where the hat channel member 110 is press-formed, a negative angle (undercut) occurring when the height direction Y is set as a press direction can be eliminated, and thus an effect that a forming process is facilitated can be obtained.

Further, since the structural member 100 according to the present embodiment is constituted by the hat channel member 110 and the joining member 120, an effect that the length of the perimeter of a cross section surrounded by a closed cross section relative to area can be reduced and the three-point bending characteristics obtained relative to the weight of the member (for example, the maximum load) can be efficiently increased can be obtained.

Hereinafter, the first bead and the second bead will be described.

(First Bead)

Two first beads 150 and 150 in the longitudinal direction Z are formed on the top sheet portion 111 in parallel.

As shown in FIG. 3, the first bead 150 is formed to bulge inward from the top sheet portion 111 at a central portion of the top sheet portion 111 in the width direction X.

The first bead 150 may have an R portion having a predetermined radius of curvature at an end portion on a side of the top sheet portion 111. In that case, the first bead 150 is connected to the top sheet portion 111 via the R portion of the first bead 150.

By providing such a first bead 150, it is possible to increase the deformation resistance against the compressive stress in the longitudinal direction Z generated in the top sheet portion 111. As a result, when the structural member 100 is subjected to bending deformation, the occurrence of early buckling deformation in the top sheet portion 111 is curbed and the maximum load is increased.

The first bead 150 may be simultaneously formed with the same die when the top sheet portion 111, the side wall portion 115, and the flange portion 119 are press-formed, or may be formed with another die or tool before the top sheet portion 111, the side wall portion 115, and the flange portion 119 are press-formed.

As shown in FIG. 3, the first bead 150 is formed by a pair of bead side walls 151 and 151 and a bead bottom sheet 152.

The pair of bead side walls 151 and 151 bend from the top sheet portion 111 and extend inward.

The bead bottom sheet 152 extends to connect end portions of the pair of bead side walls 151 and 151 opposite to the top sheet portion 111.

As shown in FIG. 3, the first bead 150 has a predetermined depth d1 and a predetermined width w1.

The depth d1 of the first bead 150 is a separation distance in the height direction Y from an outer surface of the top sheet portion 111 to an outer surface of the bead bottom sheet 152 in the first bead 150. In a case where the first bead 150 has a shape in which the depth changes in the longitudinal direction Z, the maximum value of the separation distance in the height direction Y from the top sheet portion 111 to the bead bottom sheet 152 is defined as the depth d1.

As the depth d1 of the first bead 150 becomes larger, it is possible to increase the deformation resistance against the compressive stress in the longitudinal direction Z generated in the top sheet portion 111, and the early buckling deformation in the top sheet portion 111 is curbed and the maximum load is increased. Therefore, the depth d1 of the first bead 150 is preferably 5 mm or more and is more preferably 8 mm or more.

On the other hand, if the depth d1 of the first bead 150 is too large, the pair of bead side walls 151 and 151 may be likely to collapse in a direction in which the pair of the bead side walls 151 and 151 approach each other immediately after the impact load from the outside of the automobile is input to the top sheet portion 111. When the pair of bead side walls 151 and 151 are likely to collapse in a direction in which the pair of bead side walls 151 and 151 approach each other, the pair of side wall portions 115 and 115 are also likely to collapse in a direction in which the pair of side wall portions 115 and 115 approach each other. In this case, while the pair of bead side walls 151 and 151 collapse in a direction in which the pair of bead side wall 151 and 151 approach each other, the time when the deformation resistance to the compressive stress in the longitudinal direction Z generated in the top sheet portion 111 increases may be delayed. Further, if the depth d1 of the first bead 150 is too large and the width w1 of the first bead 150 is relatively small, the forming process of the first bead 150 may be difficult. Therefore, the depth d1 of the first bead 150 is preferably 20 mm or less and is more preferably 16 mm or less.

The width w1 of the first bead 150 is a separation distance between an intersection point of a virtual straight line extending on one bead side wall 151 of the first bead 150 and a virtual straight line extending on the top sheet portion 111 and an intersection point of a virtual straight line extending on the other bead side wall 151 of the first bead 150 and the virtual straight line extending on the top sheet portion 111 in the outer surface of the top sheet portion 111 having a cross section perpendicular to the longitudinal direction Z.

In a case where the first bead 150 has a shape in which the width changes in the longitudinal direction Z, a separation distance in a cross section where the separation distance is maximum is defined as the width w1.

As the width w1 of the first bead 150 becomes smaller, it is possible to increase the deformation resistance against the compressive stress in the longitudinal direction Z generated in the top sheet portion 111, and the early buckling deformation in the top sheet portion 111 is curbed and the maximum load is increased. Therefore, the width w1 of the first bead 150 is preferably 20 mm or less and is more preferably 15 mm or less.

On the other hand, if the width w1 of the first bead 150 is too small and the depth d1 of the first bead 150 is relatively large, the forming process of the first bead 150 may be difficult. Therefore, the width w1 of the first bead 150 is preferably 5 mm or more and is more preferably 8 mm or more.

The first bead 150 does not necessarily have to be formed over the entire length of the top sheet portion 111 in the longitudinal direction Z and may be formed over a part of the entire length of the top sheet portion 111. As a position where the first bead 150 is formed, a position where the structural member 100 has to be most strengthened in the bending-crushing characteristics, for example, a position where the impactor comes into contact with the structural member 100 (a position where a collision load is input), and the vicinity thereof may be selected. Further, the first beads 150 may be formed at a plurality of positions in the longitudinal direction Z.

As described above, the depth d1 and the width w1 of the first bead 150 influence the deformation resistance against the compressive stress in the longitudinal direction Z generated in the top sheet portion 111. In a case where an aspect ratio A1 obtained by the depth d1 with respect to the width w1 (the depth d1/the width w1) of the first bead 150 is 0.25 or more and 4.0 or less, this is preferable because an effect of increasing the deformation resistance against the compressive stress in the longitudinal direction Z generated in the top sheet portion 111 can be more reliably exhibited. It is more preferable that the aspect ratio A1 be 0.5 or more and 2.0 or less.

(Second Bead)

A plurality of second beads 160 in a direction intersecting the longitudinal direction Z are formed on the pair of side wall portions 115 and 115 in parallel.

Figure 4:
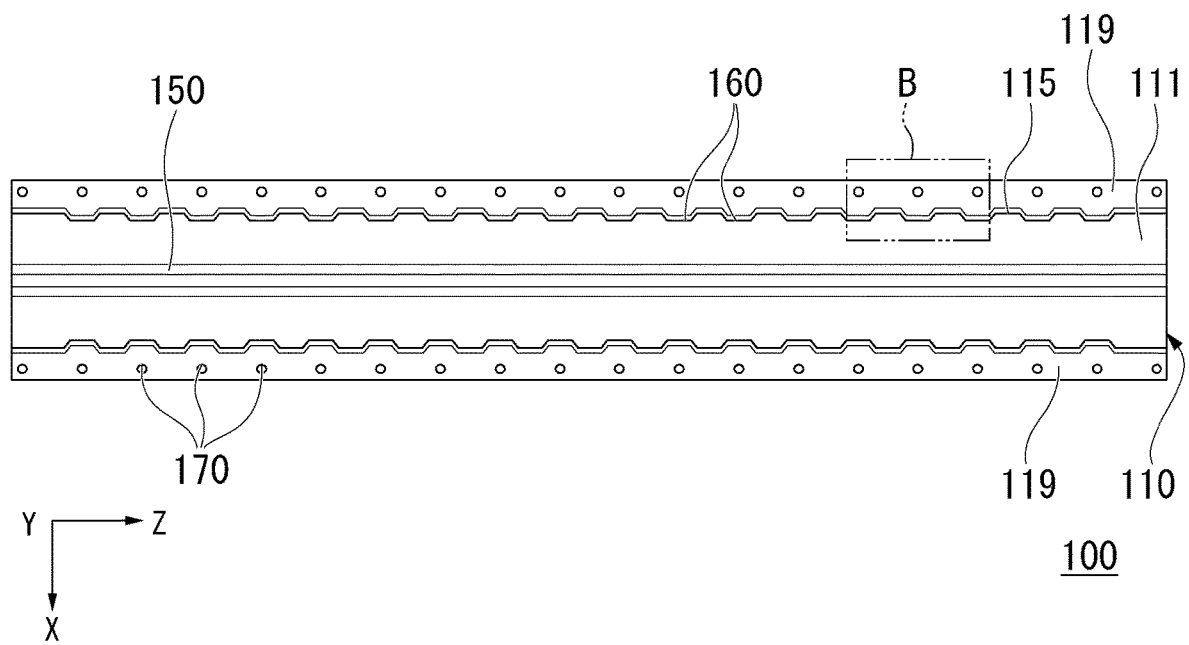
FIG. 4 is a schematic plan view of the structural member 100 according to the first embodiment.
Figure 5:
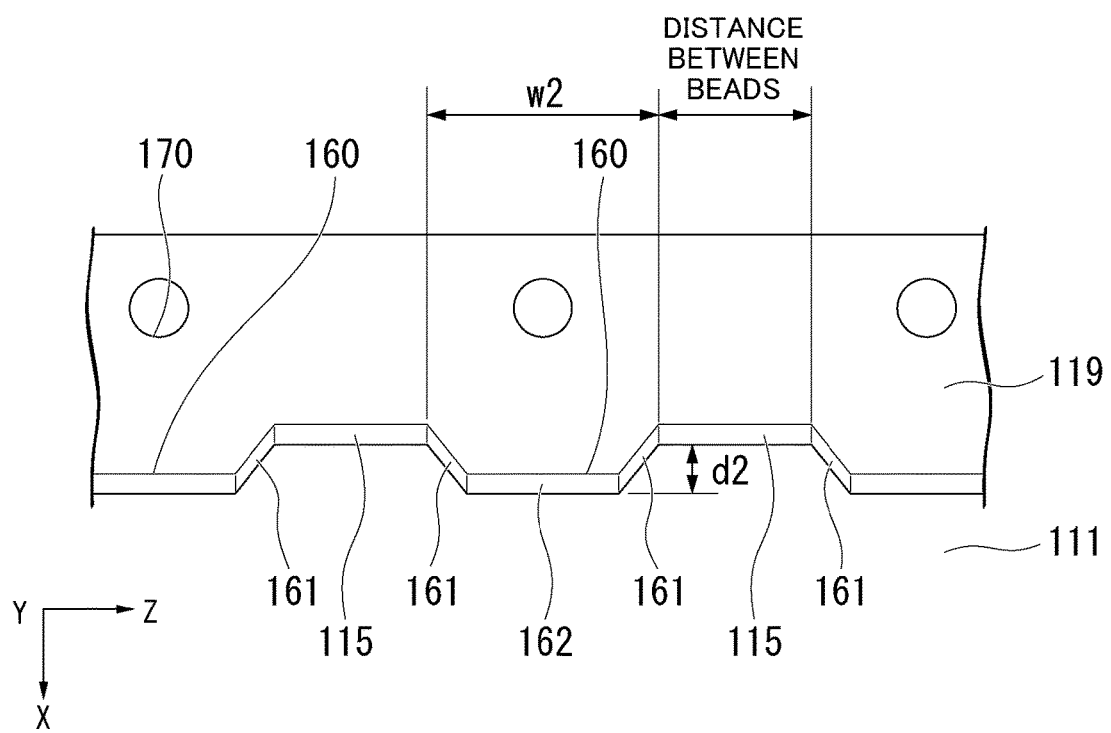
FIG. 5 is an enlarged view of a portion B of FIG. 4.

FIG. 4 is a schematic plan view of the structural member 100 according to the present embodiment, and FIG. 5 is an enlarged view of portion B of FIG. 4.

As shown in FIGS. 4 and 5, the second bead 160 is formed to bulge inward from the side wall portion 115.

The second bead 160 may have an R portion having a predetermined radius of curvature at an end portion on a side of the side wall portion 115. In that case, the second bead 160 is connected to the side wall portion 115 via the R portion of the second bead 160.

By providing such a second bead 160, it is possible to increase the deformation resistance against the compressive stress in a direction intersecting the longitudinal direction Z generated in the side wall portion 115. As a result, early buckling deformation in the side wall portion 115 is curbed and the maximum load is increased.

The second bead 160 is preferably formed on each side wall portion 115 of the pair of side wall portions 115 and 115. As a result, it is possible to further increase the deformation resistance against the compressive stress in a direction intersecting the longitudinal direction Z generated in the side wall portion 115 as compared with the case where the second bead 160 is formed only on one side wall portion 115.

In the structural member 100 according to the present embodiment, the second bead 160 is formed to extend from the first corner portion 113 to the second corner portion 117.

Since the second bead 160 is formed to extend from the first corner portion 113, the second bead 160 also contributes to the deformation resistance of the first corner portion 113 in the height direction Y, and the first corner portion 113 is less likely to be crushed. Since the first corner portion 113 is less likely to be crushed, the upper portion of the side wall portion 115 connected to the first corner portion 113 is also further less likely to be crushed. This is preferable because the first corner portion 113 and the side wall portion 115 are less likely to be crushed, and thus the decrease in the bending rigidity in the height direction Y of the cross section intersecting the longitudinal direction Z due to the decrease in the height of the structural member 100 can be curbed, the decrease of the three-point bending characteristics in the local buckling mode can be prevented. In a case where the second bead 160 is formed to extend from the first corner portion 113 in this way, a step caused by a portion of a bead bottom sheet 162 of the second bead 160, which will be described later, and a portion of the side wall portion 115 on which the second bead 160 is not formed is formed on the first corner portion 113 in the longitudinal direction Z.

Further, since the second bead 160 is formed to extend from the first corner portion 113 to the second corner portion 117, the second bead 160 also contributes to the deformation resistance of the second corner portion 117 in the height direction Y, and the second corner portion 117 is also less likely to be crushed. Therefore, this is preferable because the first corner portion 113, the side wall portion 115, and the second corner portion 117 are less likely to be crushed, and thus the decrease in the bending rigidity in the height direction Y of the cross section intersecting the longitudinal direction Z due to the decrease in the height of the structural member 100 can be further curbed, and the decrease in the three-point bending characteristics in the local buckling mode can be further prevented.

Similar to the first bead 150, the second bead 160 may be simultaneously formed with the same die when the top sheet portion 111, the side wall portion 115, and the flange portion 119 are press-formed, or may be formed with another die or tool before the top sheet portion 111, the side wall portion 115, and the flange portion 119 are press-formed.

As shown in FIG. 5, the second bead 160 is formed by a pair of bead side walls 161 and 161 and a bead bottom sheet 162.

The pair of bead side walls 161 and 161 bend from the side wall portion 115 and extend inward.

The bead bottom sheet 162 extends to connect end portions of the pair of bead side walls 161 and 161 opposite to the side wall portion 115.

As shown in FIG. 5, the second bead 160 has a predetermined depth d2 and a predetermined width w2.

The depth d2 of the second bead 160 is a separation distance in the width direction X from an outer surface of the side wall portion 115 to an outer surface of the bead bottom sheet 162 in the second bead 160. In a case where the second bead 160 has a shape in which the depth changes in a direction intersecting the longitudinal direction Z, the maximum value of the separation distance in the width direction X from the side wall portion 115 to the bead bottom sheet 162 is defined as the depth d2.

As the depth d2 of the second bead 160 becomes larger, it is possible to further increase the deformation resistance against the compressive stress in a direction intersecting the longitudinal direction Z generated in the side wall portion 115. Therefore, the depth d2 of the second bead 160 is preferably 2 mm or more and is more preferably 4 mm or more.

On the other hand, if the depth d2 of the second bead 160 is too large, the dimension of the structural member 100 in the width direction X becomes a locally small value, and the bending rigidity in the cross section intersecting the longitudinal direction Z becomes too small, the desired three-point bending characteristics may not be obtained. Further, as will be described later, in a configuration in which the first bead 150 is formed in the vicinity of the end portion of the top sheet portion 111 in the width direction X, if the depth d2 of the second bead 160 is too large, the first bead 150 may not be formed at a desired position. Further, if the depth d2 of the second bead 160 is too large and the width w2 of the second bead 160 is relatively small, the forming process of the second bead 160 may be difficult. Therefore, the depth d2 of the second bead 160 is preferably 10 mm or less and is more preferably 8 mm or less.

The plurality of second beads 160 are preferably formed with a distance between the beads of 50 mm or less in the longitudinal direction Z of the side wall portion 115 and are more preferably formed with a distance between the beads of 30 mm or less in the longitudinal direction Z of the side wall portion 115. In this case, it is possible to further increase the deformation resistance against the compressive stress in a direction intersecting the longitudinal direction Z generated in the side wall portion 115. As shown in FIG. 5, the distance between the beads is a separation distance between one end portion of the second bead 160 and the other end portion of the adjacent second bead 160.

The plurality of second beads 160 do not have to be formed over the entire length of the side wall portion 115 and only have to be formed over a part of the entire length of the side wall portion 115. As a position where the plurality of second beads 160 are formed, a position where the structural member 100 is most strengthened in the bending-crushing characteristics, for example, a position where the impactor comes into contact with the structural member 100, and the vicinity thereof may be selected.

Further, the plurality of second beads 160 do not have be formed side by side at the side wall portion 115 with an equal distance between the beads. For example, in a case where three second beads 160 are formed, the distances between the two beads may be different values.

Further, the plurality of second beads 160 do not necessarily have to be formed at the same position in the longitudinal direction Z in the pair of side wall portions 115 and 115. For example, at the same position in the longitudinal direction Z as the second bead 160 formed on one side wall portion 115, the second bead 160 may not be formed on the other side wall portion 115.

The width w2 of the second bead 160 is a separation distance between an intersection point of a virtual straight line extending on one bead side wall 161 of the second bead 160 and a virtual straight line extending on the side wall portion 115 and an intersection point of a virtual straight line extending on the other bead side wall 161 of the second bead 160 and the virtual straight line extending on the side wall portion 115 in the outer surface of the side wall portion 115 having a cross section perpendicular to the height direction Y.

In a case where the second bead 160 has a shape in which the width changes in a direction intersecting the longitudinal direction Z, a separation distance in a cross section where the separation distance is maximum is defined as the width w2.

As the width w2 of the second bead 160 becomes smaller, it is possible to further increase the deformation resistance against the compressive stress in a direction intersecting the longitudinal direction Z generated in the side wall portion 115. Therefore, the width w2 of the second bead 160 is preferably 60 mm or less and is more preferably 40 mm or less.

On the other hand, if the width w2 of the second bead 160 is too small and the depth d2 of the second bead 160 is relatively large, the forming process of the second bead 160 may be difficult. Therefore, the width w2 of the second bead 160 is preferably 10 mm or more and is more preferably 15 mm or more.

As described above, the depth d2 and the width w2 of the second bead 160 influence the deformation resistance against the compressive stress in a direction intersecting the longitudinal direction Z generated in the side wall portion 115. In a case where an aspect ratio A2 obtained by the depth d2 with respect to the width w2 (the depth d2/the width w2) of the second bead 160 is 0.05 or more and 1.0 or less, this is preferable because an effect of increasing the deformation resistance against the compressive stress in a direction intersecting the longitudinal direction Z generated in the side wall portion 115 can be more reliably exhibited. It is more preferable that the aspect ratio A2 be 0.1 or more and 0.5 or less.

Figure 6:
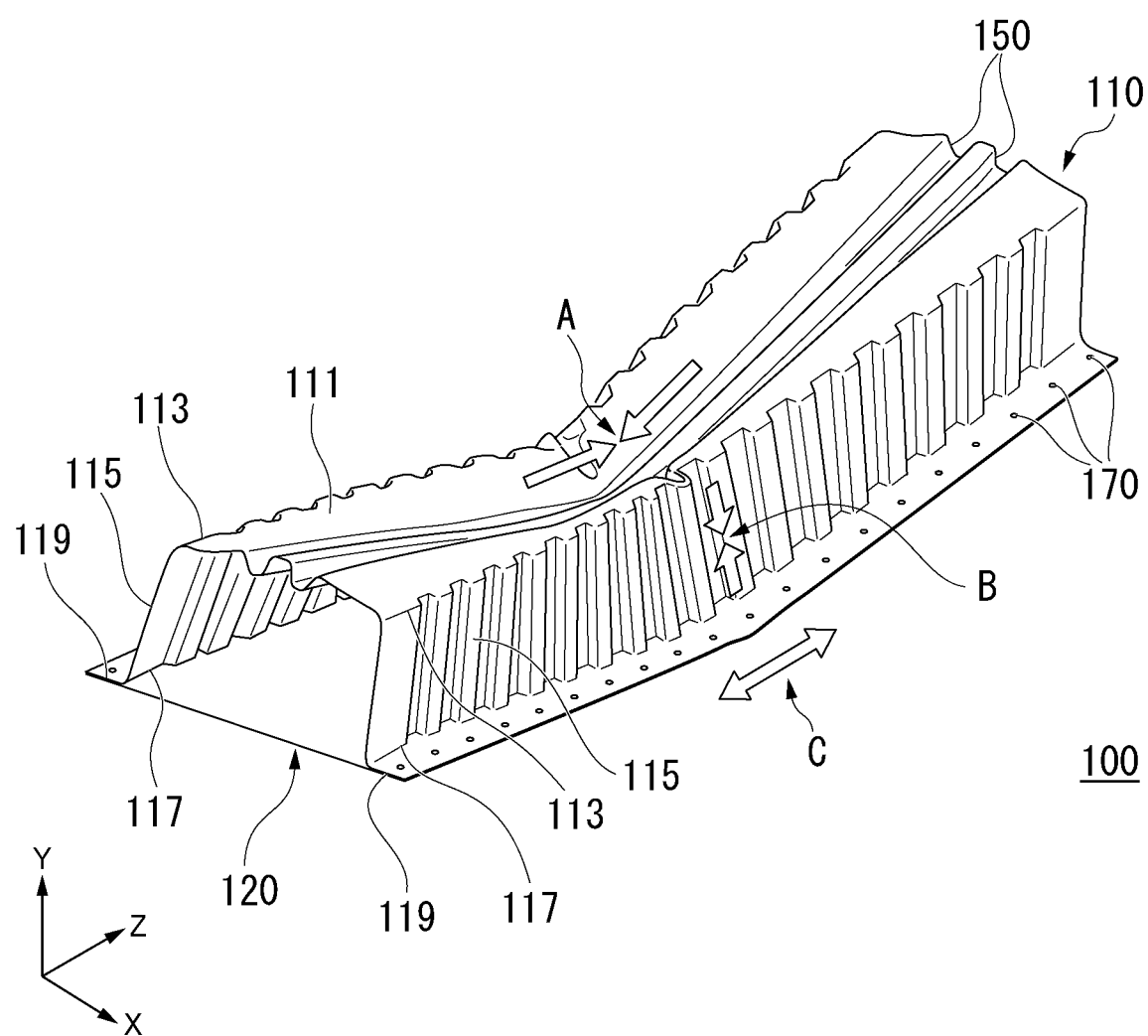
FIG. 6 is a perspective view showing a deformed state of the structural member 100 according to the first embodiment.

The structural member 100 according to the present embodiment described above has a perpendicular cross-section portion that forms the first beads 150 and 150 and the second bead 160 on at least one of the pair of side wall portions 115 and 115 in a cross section perpendicular to the longitudinal direction Z. According to the structural member 100 of the present embodiment, when an impact load from the outside of the automobile is input to the top sheet portion 111 and bending deformation occurs in the structural member 100, as shown in FIG. 6, the deformation resistance against the compressive stress (A) in the longitudinal direction Z generated in the top sheet portion 111, the deformation resistance against the compressive stress (B) in a direction intersecting longitudinal direction Z generated in the side wall portion 115, and the deformation resistance against the tensile stress (C) in the longitudinal direction Z generated in the joining member 120 can be exhibited in a complex manner. As a result, the load capacity can be improved especially at the initial stage of the stroke, and the collision safety performance can be improved.

Since the deformation resistance decreases as the sheet material becomes thinner, the reduction in the deformation resistance due to thinning has been one of barriers to weight reduction with the use of a thinned high-strength material in the related art. That is, for example, even if the deformation resistance of the top sheet portion 111 in the longitudinal direction Z is increased by increasing the strength, devising the shape of the component, or the like, if the side wall portion 115 is easily buckled and deformed due to flexing deformation caused by the thinning, the structural member 100 cannot exhibit excellent three-point bending characteristics. Further, on the contrary, even if the deformation resistance of the side wall portion 115 in a direction intersecting the longitudinal direction Z is increased by increasing the strength, devising the shape of the component, or the like, if the top sheet portion 111 is easily buckled and deformed due to flexing deformation caused by the thinning, the structural member 100 cannot exhibit excellent three-point bending characteristics. According to the structural member 100 of the present embodiment, as described above, the deformation resistance of the top sheet portion 111, the side wall portion 115, and the joining member 120 can be exhibited in a complex manner, and thus even if a thinned high-strength material is used, excellent collision safety performance can be exhibited.

First Modification Example

Figure 7:
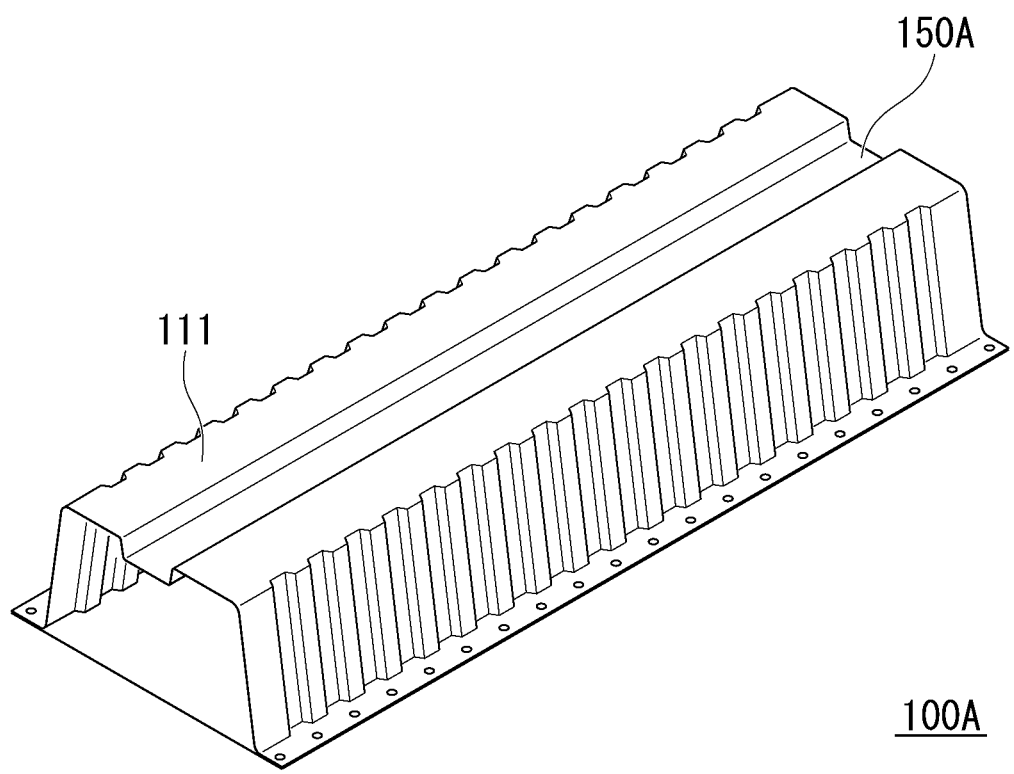
FIG. 7 is a perspective view showing a structural member 100A according to a first modification example.

In the structural member 100 according to the first embodiment, two first beads are formed on the top sheet portion 111, but as in a structural member 100A of a first modification example shown in FIG. 7, one first bead 150A may be formed on the top sheet portion 111.

Second Modification Example

Figure 8:
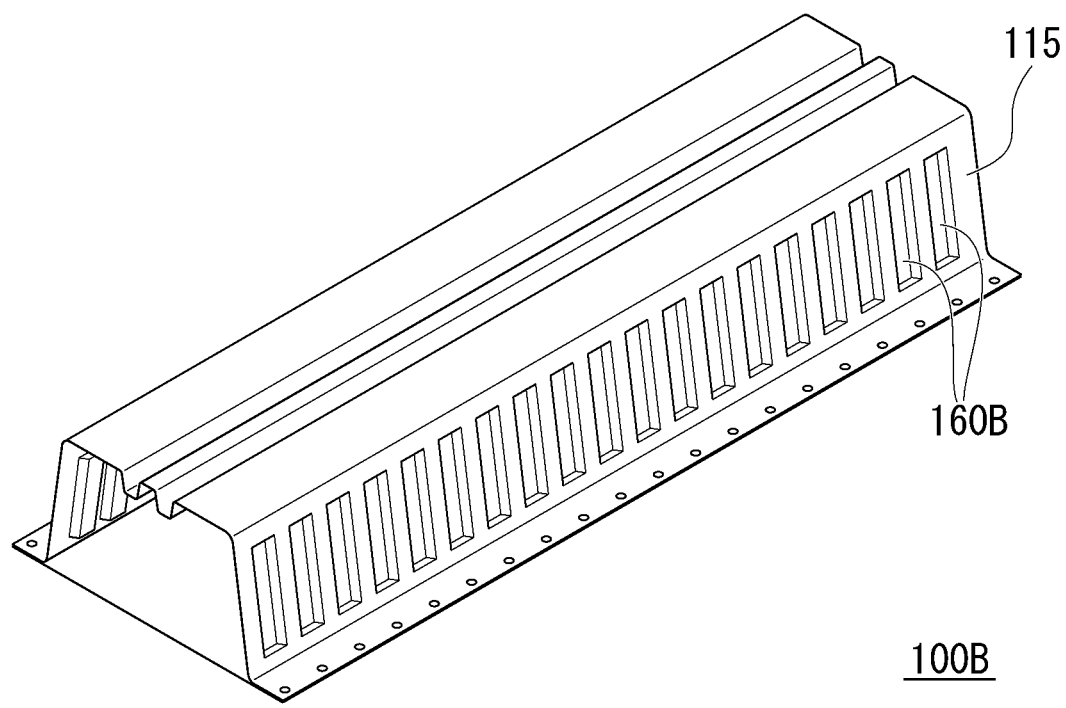
FIG. 8 is a perspective view showing a structural member 100B according to a second modification example.

In the structural member 100 according to the first embodiment, the second bead 160 is formed from the first corner portion 113 to the second corner portion 117, but as in a structural member 100B of a second modification example shown in FIG. 8, a second bead 160B may be formed only in the center of the side wall portion 115 in the height direction.

Third Modification Example

Figure 9:
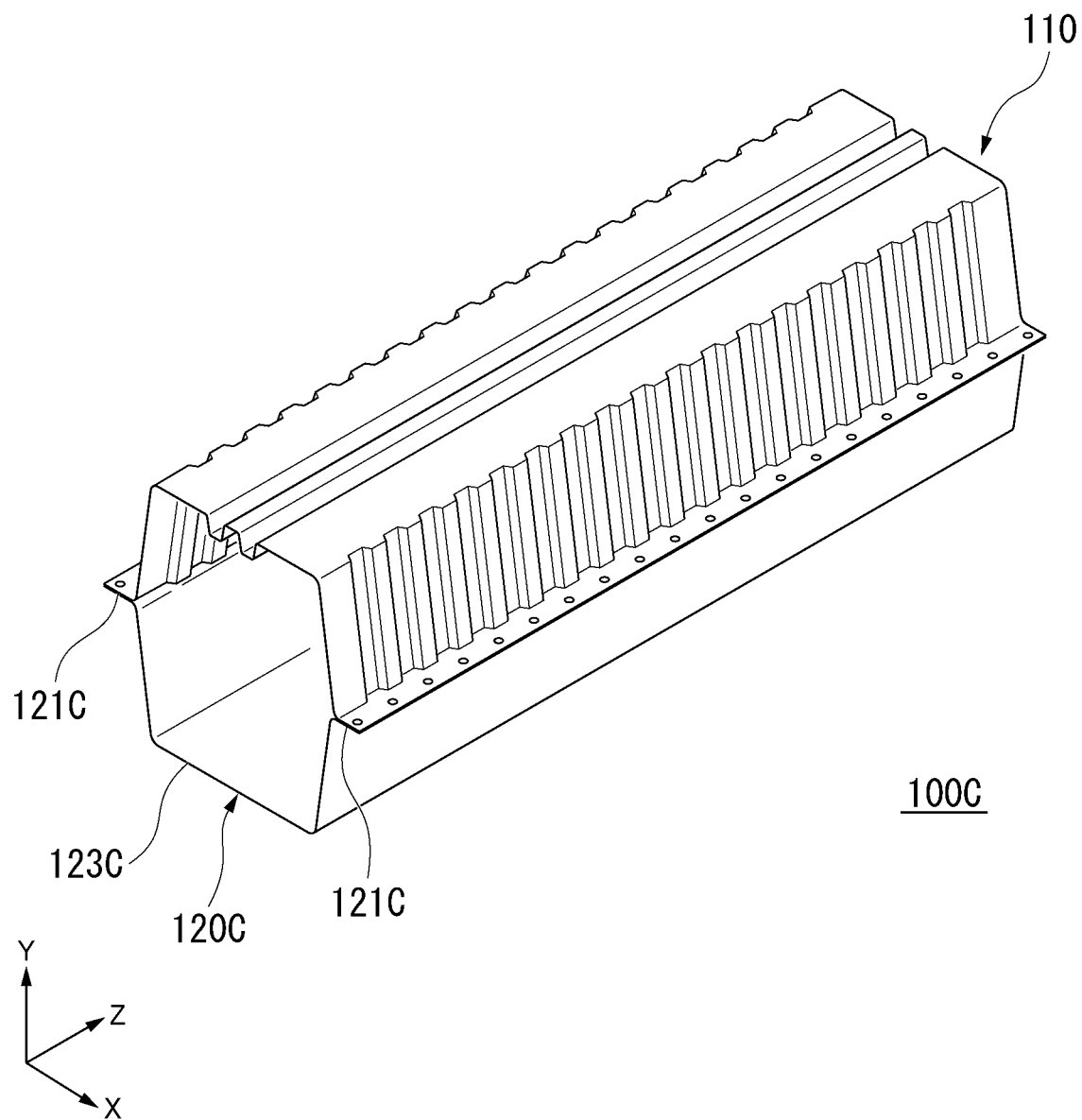
FIG. 9 is a perspective view showing a structural member 100C according to a third modification example.

In the structural member 100 according to the first embodiment, one steel sheet is used as the joining member 120, but as in a structural member 100C of a third modification example shown in FIG. 9, a hat channel member that has a pair of flange portions 121C and 121C and a top sheet portion 123C may be used as a joining member 120C. In this case, the top sheet portion 123C of the joining member 120C corresponds to the top sheet facing portion 123 of the structural member 100 according to the first embodiment. In the example shown in FIG. 9, the side wall portion of the joining member 120C is flat, but a bead extending in the height direction may be formed.

The structural member 100 according to the present embodiment has a uniform cross section in the longitudinal direction Z, but may have different cross sections in the longitudinal direction Z. For example, the structural member 100 may be curved in the longitudinal direction Z, or in the structural member 100, a cross section perpendicular to the longitudinal direction Z may change.

In the structural member 100 according to the present embodiment, the cross sections of the first bead 150 and the second bead 160 are trapezoidal, but the cross sections may be rectangular, semicircular, or wedge-shaped.

Second Embodiment

Hereinafter, a structural member 200 according to a second embodiment of the present invention will be described.

In the structural member 100 according to the first embodiment, the first bead 150 is formed at a central portion of the top sheet portion 111 of the hat channel member 110 in the width direction X.

The structural member 200 according to the present embodiment is different from the structural member 100 according to the first embodiment in that the first bead is formed in the vicinity of the end portion of the top sheet portion of the hat channel member in the width direction X.

The same reference symbols are used for elements that duplicate those described in the first embodiment such as the side wall portion 115 and the joining member 120, and the description thereof will be omitted.

First, a schematic configuration of the structural member 200 according to the present embodiment will be described with reference to FIG. 10.

Figure 10:
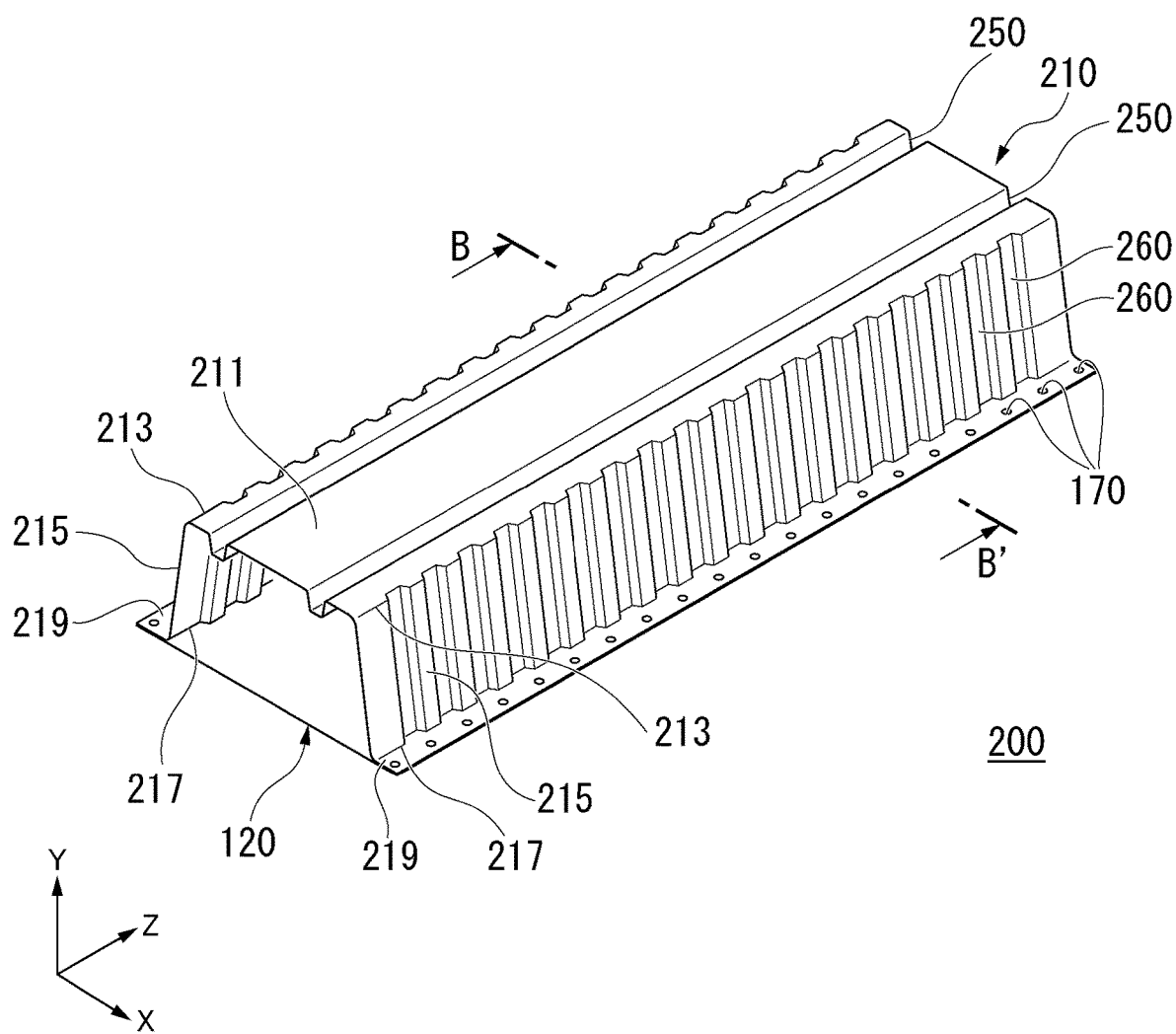
FIG. 10 is a perspective view showing a structural member 200 according to a second embodiment of the present invention.

As shown in FIG. 10, the structural member 200 is a member having a closed cross-section structure constituted by a hat channel member 210 and a joining member 120. Application examples of the structural member 200 include a B pillar, a side sill, a bumper reinforcement, and the like.

Similar to the structural member 100 according to the first embodiment, the structural member 200 according to the present embodiment is a component which is assumed to be installed in an automobile in a posture in which the hat channel member 210 faces the outside of the automobile and the joining member 120 faces the inside of the automobile.
(Hat Channel Member)

Figure 11:
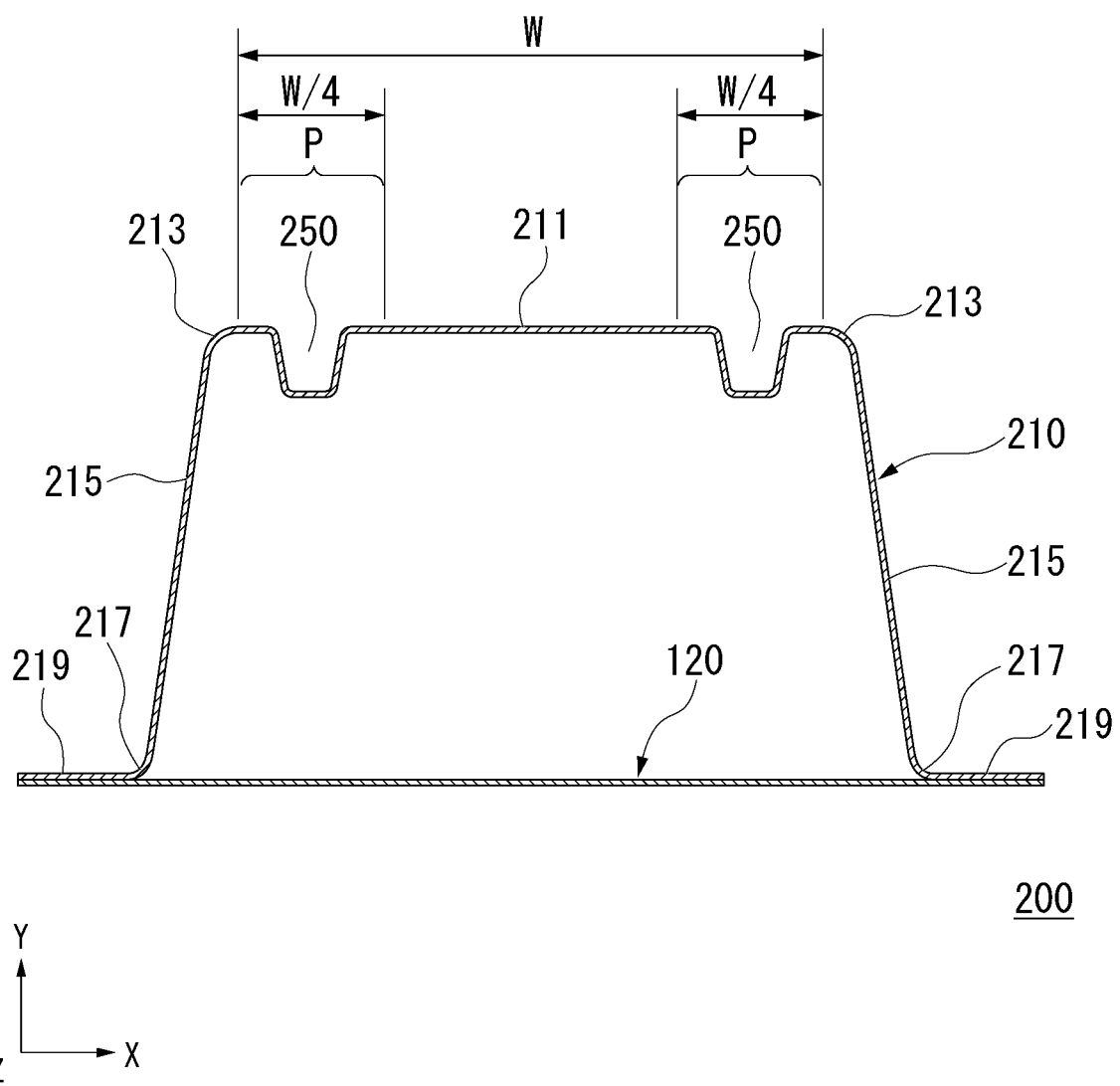
FIG. 11 is a cross-sectional view along line B-B' of FIG. 10.

FIG. 11 is a cross-sectional view along line B-B' of FIG. 10. As shown in FIG. 11, the hat channel member 210 has a top sheet portion 211 extending in the longitudinal direction Z, a pair of side wall portions 215 and 215 extending via first corner portions 213 and 213 formed at both ends of the top sheet portion 211 in the width direction X, and a pair of flange portions 219 and 219 extending via second corner portions 217 and 217 formed at end portions of the pair of side wall portions 215 and 215 on sides opposite to the first corner portions 213 and 213.
(First Bead)

Two first beads 250 and 250 in the longitudinal direction Z are formed on the top sheet portion 211 in parallel in the width direction X.

As shown in FIG. 11, each of the first beads 250 and 250 is formed such that a center of the first bead 250 in the width direction is disposed and the first bead 250 bulges inward from the top sheet portion 211 at a vicinity portion P of each of both ends of the top sheet portion 211 in the width direction X.

More specifically, the vicinity portion P is a region from a boundary point between the top sheet portion 211 and the first corner portion 213 to a point having a separation distance of ¼ of a width W of the top sheet portion 211 in the width direction X in a cross section perpendicular to the longitudinal direction Z of the structural member 200.

From another point of view, each of the first beads 250 and 250 may be formed such that a boundary point between the first bead 250 and the top sheet portion 211 is positioned in a region from the boundary point between the top sheet portion 211 and the first corner portion 213 to a point having a separation distance of 20 mm and the first bead 250 bulges inward from the top sheet portion 211 in a cross section perpendicular to the longitudinal direction Z.
(Second Bead)

A plurality of second beads 260 in a direction intersecting the longitudinal direction Z are formed on the pair of side wall portions 215 and 215 in parallel.

Figure 12:
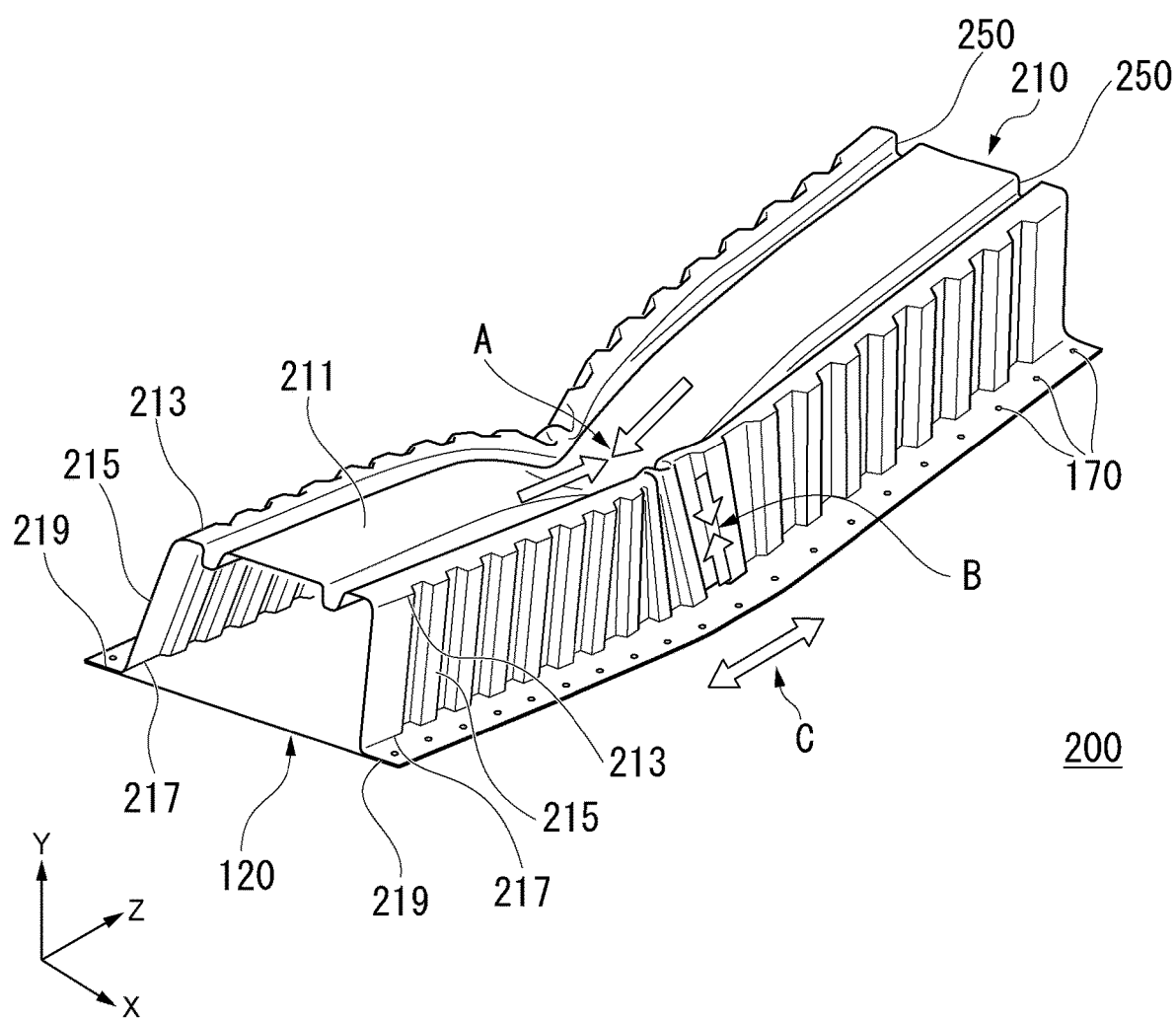
FIG. 12 is a perspective view showing a deformed state of the structural member 200 according to the second embodiment.

The structural member 200 according to the present embodiment described above has a perpendicular cross-section portion that forms the first beads 250 and 250 and the second bead 260 on at least one of the pair of side wall portions 215 and 215 in a cross section perpendicular to the longitudinal direction Z. According to the structural member 200 of the present embodiment, when an impact load from the outside of the automobile is input to the top sheet portion 211 and bending deformation occurs in the structural member 200, as shown in FIG. 12, the deformation resistance against the compressive stress (A) in the longitudinal direction Z generated in the top sheet portion 211, the deformation resistance against the compressive stress (B) in a direction intersecting longitudinal direction Z generated in the side wall portion 215, and the deformation resistance against the tensile stress (C) in the longitudinal direction Z generated in the joining member 120 can be exhibited in a complex manner.

In particular, since the first bead 250 is formed in the vicinity portions P at both ends of the top sheet portion 211 in the width direction X, the first corner portion 213 and the first bead 250 are disposed with a short distance. Therefore, in a region from the first corner portion 213 to the first bead 250, the bending rigidity in the height direction Y of the cross section intersecting the longitudinal direction Z can be effectively improved. Further, since the first corner portion 213 is a portion where the compressive stress in the longitudinal direction Z is generated when the bending deformation occurs in the structural member 100 like the top sheet portion 211, in a case where the second bead 260 formed in the side wall portion 215 extends to the vicinity of the first corner portion 213, the deformation resistance to the compressive stress of the first corner portion 213 in the longitudinal direction Z is weakened. However, according to the structural member 200 of the present embodiment, the first bead 250 is formed in the vicinity of the first corner portion 213, and thus the weakening of the deformation resistance to the compressive stress of the first corner portion 213 in the longitudinal direction Z can be efficiently compensated. Therefore, as shown in FIG. 12, the top sheet portion 211 does not undergo large flexing deformation at an early stage, and the flexing of the side wall portion 215 can also be curbed. Therefore, the load capacity at the initial stage of the stroke can be dramatically improved, and the collision safety performance can be further improved as compared with the structural member 100 according to the first embodiment.

EXAMPLE

Hereinafter, the effects of the present invention will be specifically described with reference to examples. The examples which will be described below are merely examples of the present invention and do not limit the present invention.

As Examples 1 to 7, a simulation model of a structural member constituted by a hat channel member to which a steel sheet having a sheet thickness of 0.8 mm and a tensile strength of 2.5 GPa class was applied and a joining member to which a steel sheet having a sheet thickness of 0.8 mm and a tensile strength of 440 MPa class was applied was prepared.

In the simulation model of the structural member, the first bead and the second bead were appropriately applied, and the maximum load at the initial stage of the stroke was evaluated by a simulation assuming three-point bending. The basic conditions are as follows. In these examples, an inclination angle of the bead side wall of the first bead was the same as an inclination angle of the side wall portion of the hat channel member.

Figure 13:
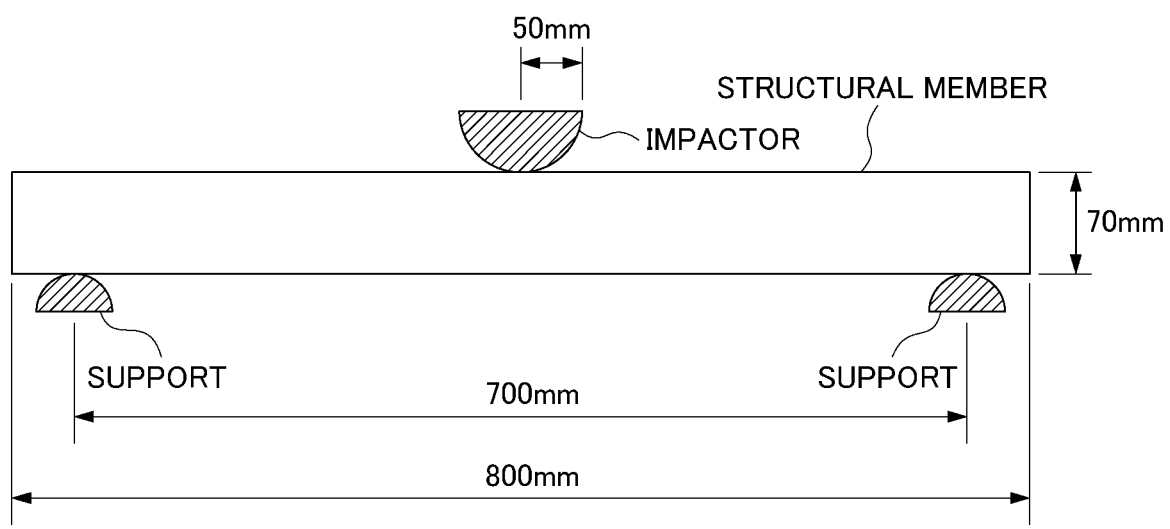
FIG. 13 is a schematic view for explaining a three-point bending condition.

Width W of top sheet portion: 90 mm
Height H of side wall portion: 60 mm
Radius of curvature of first corner portion (bending on inner side): 5 mm
Radius of curvature of second corner portion (bending on inner side): 5 mm Entire length L of structural member: 800 mm
Spot welding: 40 mm pitch
Width of top sheet facing portion: 130 mm As shown in FIG. 13, the three-point bending conditions were set such that the radius of curvature of the impactor was 50 mm and the separation distance of the support was 700 mm. Table 1 shows the bead application conditions and the evaluation results of the maximum load at the initial stage of the stroke.

TABLE 1

|  | First bead | | | Second bead | | | | Maximum load at initial stage of stroke [kN] | Remarks |
|---|---|---|---|---|---|---|---|---|---|
|  | Disposition | d1 [mm] | w1 [mm] | Disposition | d2 [mm] | w2 [mm] | Distance between beads [mm] | | |
| Example 1 | None | — | — | None | — | — | — | 12.9 | Comparative example |
| Example 2 | One at center | 10 | 30 | None | — | — | — | 16.6 | Comparative example |
| Example 3 | One at each of both end portions | 10 | 10 | None | — | — | — | 17.0 | Comparative example |
| Example 4 | None | — | — | Presence | 5 | 24 | 16 | 14.4 | Comparative example |
| Example 5 | One at center | 10 | 30 | Presence | 5 | 24 | 16 | 19.5 | Invention example |
| Example 6 | Two at center | 10 | 10 | Presence | 5 | 24 | 16 | 20.7 | Invention example |
| Example 7 | One at each of both end portions | 10 | 10 | Presence | 5 | 24 | 16 | 32.7 | Invention example |

In Examples 1 to 4, the first bead and the second bead were not formed in a complex manner, and thus the effect of improving the deformation resistance could not be exhibited.

On the other hand, in Examples 5 to 7 in which the first bead and the second bead were formed in a complex manner, the deformation resistance against the compressive stress in the longitudinal direction Z generated in the top sheet portion, the deformation resistance against the compressive stress in a direction intersecting longitudinal direction Z generated in the side wall portion, and the deformation resistance against the tensile stress in the longitudinal direction Z generated in the joining member were exhibited in a complex manner, and the load capacity at the initial stage of the stroke was improved.

Further, when Example 6 and Example 7 are compared with each other, in Example 7 in which one first bead was disposed at each of both end portions, it was shown that the load capacity at the initial stage of the stroke was increased by 1.5 times or more as compared with Example 6 in which two first beads were disposed at the central portion.

Further, as Example 1A, in a simulation model of a structural member in which the hat channel member of Example 1 was changed into a hat channel member to which a steel sheet having a sheet thickness of 1.6 mm and a tensile strength of 2.5 GPa was applied, the maximum load at the initial stage of the stroke was evaluated by a simulation assuming three-point bending.

Similarly, as Examples 4A, 6A, and 7A, in a simulation model of a structural member in which the hat channel member of each of Examples 4, 6, and 7 was changed into a hat channel member to which a steel sheet having a sheet thickness of 1.6 mm and a tensile strength of 2.5 GPa was applied, the maximum load at the initial stage of the stroke was evaluated by a simulation assuming three-point bending.

Then, in a case where the maximum load obtained in Example 1A was set to a reference value of 1.0, a ratio of the maximum load obtained in each of Examples 4A, 6A, and 7A to the maximum load obtained in Example 1A was calculated.

Further, as Example 1B, in a simulation model of a structural member in which the hat channel member of Example 1 was changed into a hat channel member to which a steel sheet having a sheet thickness of 0.8 mm and a tensile strength of 1.5 GPa was applied, the maximum load at the initial stage of the stroke was evaluated by a simulation assuming three-point bending.

Similarly, as Examples 4B, 6B, and 7B, in a simulation model of a structural member in which the hat channel member of each of Examples 4, 6, and 7 was changed into a hat channel member to which a steel sheet having a sheet thickness of 0.8 mm and a tensile strength of 1.5 GPa was applied, the maximum load at the initial stage of the stroke was evaluated by a simulation assuming three-point bending.

Then, in a case where the maximum load obtained in Example 1B was set to a reference value of 1.0, a ratio of the maximum load obtained in each of Examples 4B, 6B, and 7B to the maximum load obtained in Example 1 B was calculated.

Further, as Example IC, in a simulation model of a structural member in which the hat channel member of Example 1 was changed into a hat channel member to which a steel sheet having a sheet thickness of 1.6 mm and a tensile strength of 1.5 GPa was applied, the maximum load at the initial stage of the stroke was evaluated by a simulation assuming three-point bending.

Similarly, as Examples 4C, 6C, and 7C, in a simulation model of a structural member in which the hat channel member of each of Examples 4, 6, and 7 was changed into a hat channel member to which a steel sheet having a sheet thickness of 1.6 mm and a tensile strength of 1.5 GPa was applied, the maximum load at the initial stage of the stroke was evaluated by three-point bending. Then, in a case where the maximum load obtained in Example IC was set to a reference value of 1.0, a ratio of the maximum load obtained in each of Examples 4C, 6C, and 7C to the maximum load obtained in Example 1C was calculated.

The evaluation results are shown in Table 2.

TABLE 2

| | Sheet thickness (mm) | Tensile strength (GPa) | Ratio of maximum load to reference value | Remarks |
|---|---|---|---|---|
| Example 1 | 0.8 | 2.5 | 1.00 (Reference value) | Comparative example |
| Example 4 | 0.8 | 2.5 | 1.12 | Comparative example |
| Example 6 | 0.8 | 2.5 | 1.61 | Invention example |
| Example 7 | 0.8 | 2.5 | 2.54 | Invention example |
| Example 1A | 1.6 | 2.5 | 1.00 (Reference value) | Comparative example |
| Example 4A | 1.6 | 2.5 | 1.09 | Comparative example |
| Example 6A | 1.6 | 2.5 | 1.60 | Invention example |
| Example 7A | 1.6 | 2.5 | 1.93 | Invention example |
| Example 1B | 0.8 | 1.5 | 1.00 (Reference value) | Comparative example |
| Example 4B | 0.8 | 1.5 | 1.08 | Comparative example |
| Example 6B | 0.8 | 1.5 | 1.68 | Invention example |
| Example 7B | 0.8 | 1.5 | 2.54 | Invention example |
| Example 1C | 1.6 | 1.5 | 1.00 (Reference value) | Comparative example |
| Example 4C | 1.6 | 1.5 | 1.04 | Comparative example |
| Example 6C | 1.6 | 1.5 | 1.62 | Invention example |
| Example 7C | 1.6 | 1.5 | 1.92 | Invention example |

Figure 14:
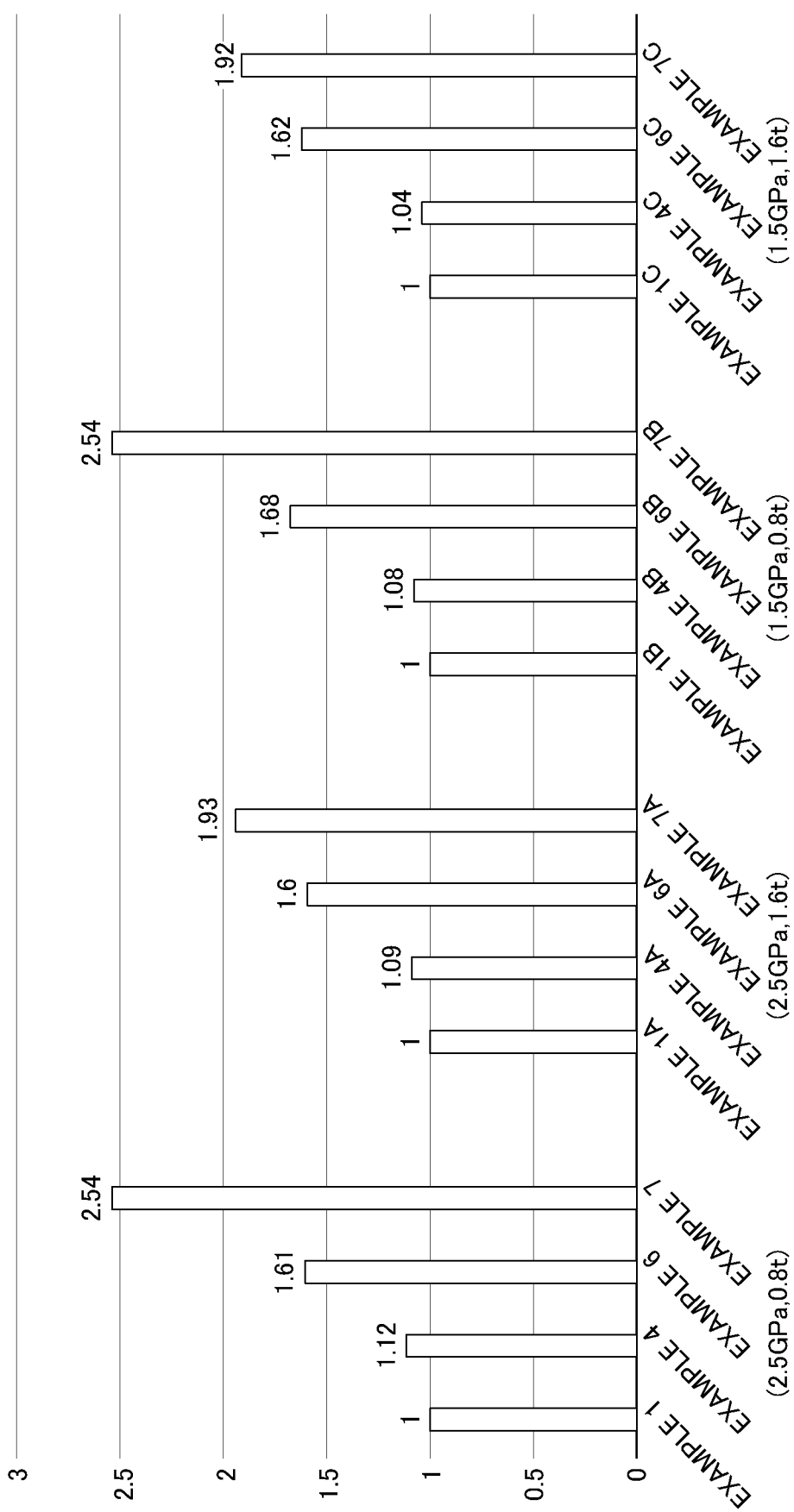
FIG. 14 is a graph showing results of examples.

FIG. 14 is a graph showing the results of Table 2 collectively. From this graph, it was shown that according to the present invention, an excellent load capacity could be exhibited at the initial stage of the stroke regardless of the sheet thickness and the strength, and in a case where one first bead was disposed at each of both end portions of the top sheet portion, a higher load capacity could be exhibited when the thinning is performed.

In addition, it was shown that even in a case where the hat channel member was thinned, the decrease in the deformation resistance due to the decrease in the sheet thickness could be curbed, and even if a thinned high-strength material was used, excellent collision safety performance could be exhibited.

Further, it was shown that the effect of curbing the decrease in the deformation resistance in a case where the hat channel member was thinned was prominent in Examples 7 and 7B in which one first bead was disposed at each of both end portions of the top sheet portion.

INDUSTRIAL APPLICABILITY

According to the present invention, it is possible to provide a structural member capable of exhibiting excellent collision safety performance by improving a load capacity at an initial stage of a stroke of a deformation in a local buckling mode.

BRIEF DESCRIPTION OF THE REFERENCE SYMBOLS 100, 100A, 100B, 100C, 200 Structural member
110, 210 Hat channel member
111, 211 Top sheet portion
113, 213 First corner portion
115, 215 Side wall portion
117, 217 Second corner portion
119, 219 Flange portion
120, 120C Joining member
121 Joining portion
121C Flange portion
123 Top sheet facing portion
123C Top sheet portion
150, 150A, 250 First bead
160, 160B, 260 Second bead

The invention claimed is:

1. A structural member for an automobile body, comprising:
a hat channel member that has
a top sheet portion extending in a longitudinal direction,
a pair of side wall portions extending via first corner portions formed at both end portions of the top sheet portion in a width direction, and
a pair of flange portions extending via second corner portions formed at end portions of the pair of side wall portions on sides opposite to the first corner portions; and
a joining member that has
a pair of joining portions joined to the pair of flange portions of the hat channel member, and
a top sheet facing portion facing the top sheet portion of the hat channel member,
wherein a first bead extending in the longitudinal direction is formed on the top sheet portion,
wherein two or more second beads extending in a direction intersecting the longitudinal direction are formed on the pair of side wall portions, and
wherein two or more of the first beads are formed in parallel in the width direction.

2. The structural member for an automobile body according to claim 1, wherein the first bead is formed such that a center of the first bead in the width direction is positioned in a region from a boundary point between the top sheet portion and the first corner portion to a point having a separation distance of ¼ of a width of the top sheet portion in the width direction in a cross section perpendicular to the longitudinal direction.

3. The structural member for an automobile body according to claim 1, wherein the first bead is formed such that a boundary point between the first bead and the top sheet portion is positioned in a region from a boundary point between the top sheet portion and the first corner portion to a point having a separation distance of 20 mm in a cross section perpendicular to the longitudinal direction.

4. The structural member for an automobile body according to claim 1, wherein the second bead extends from the first corner portion.

5. The structural member for an automobile body according to claim 4, wherein the second bead extends to the second corner portion.

6. The structural member for an automobile body according to claim 1,
wherein a width of the first bead is 5 mm to 20 mm, and
wherein a depth of the first bead is 5 mm to 20 mm.

7. The structural member for an automobile body according to claim 1, wherein an aspect ratio calculated as a depth/a width of the first bead is 0.25 to 4.0.

8. The structural member for an automobile body according to claim 1,
wherein a width of the second bead is 10 mm to 60 mm, and
wherein a depth of the second bead is 2 mm to 10 mm.

9. The structural member for an automobile body according to claim 1, wherein an aspect ratio calculated as a depth/a width of the second bead is 0.05 to 1.0.

10. The structural member for an automobile body according to claim 1, wherein the top sheet portion of the hat channel member is formed of a steel sheet having a sheet thickness of 1.2 mm or less.

11. The structural member for an automobile body according to claim 1, wherein the top sheet portion of the hat channel member is formed of a steel sheet having a tensile strength of 980 MPa or more.

12. The structural member for an automobile body according to claim 1, wherein the hat channel member is a quenched member.

13. The structural member for an automobile body according to claim 2, wherein the second bead extends from the first corner portion.

14. The structural member for an automobile body according to claim 2,
wherein a width of the first bead is 5 mm to 20 mm, and
wherein a depth of the first bead is 5 mm to 20 mm.

15. The structural member for an automobile body according to claim 2, wherein an aspect ratio calculated as a depth/a width of the first bead is 0.25 to 4.0.

16. The structural member for an automobile body according to claim 2,
wherein a width of the second bead is 10 mm to 60 mm, and
wherein a depth of the second bead is 2 mm to 10 mm.

17. The structural member for an automobile body according to claim 2, wherein an aspect ratio calculated as a depth/a width of the second bead is 0.05 to 1.0.

18. The structural member for an automobile body according to claim 2, wherein the top sheet portion of the hat channel member is formed of a steel sheet having a sheet thickness of 1.2 mm or less.

19. The structural member for an automobile body according to claim 2, wherein the top sheet portion of the hat channel member is formed of a steel sheet having a tensile strength of 980 MPa or more.

20. The structural member for an automobile body according to claim 2, wherein the hat channel member is a quenched member.

* * * * *